United States Patent
Crosby

(10) Patent No.: US 6,574,246 B1
(45) Date of Patent: Jun. 3, 2003

(54) MEASURING DELAY VARIATION OF REGENERATED DATA CLOCK AND OF ASSOCIATED DATA PACKETS

(75) Inventor: Philip S. Crosby, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/251,946

(22) Filed: Feb. 17, 1999

(51) Int. Cl.[7] .................................................. H04J 3/06
(52) U.S. Cl. ..................................................... 370/516
(58) Field of Search ............................. 370/252, 395.1, 370/412, 465, 468, 503, 516, 517

(56) References Cited

U.S. PATENT DOCUMENTS

| | | | | |
|---|---|---|---|---|
| 5,761,203 A | * | 6/1998 | Morales ....................... | 370/418 |
| 5,790,543 A | * | 8/1998 | Cloutier ....................... | 370/252 |
| 5,844,891 A | * | 12/1998 | Cox .............................. | 370/325 |
| 5,872,789 A | * | 2/1999 | Orleth et al. ................ | 370/517 |
| 6,252,850 B1 | * | 6/2001 | Lauret ......................... | 370/235 |
| 6,330,285 B1 | * | 12/2001 | Crosby et al. .............. | 370/509 |

* cited by examiner

*Primary Examiner*—Chau Nguyen
*Assistant Examiner*—Paresh Gandhi
(74) *Attorney, Agent, or Firm*—Francis I. Gray

(57) ABSTRACT

An apparatus and method for measuring delay variation of a regenerated data clock and of the associated data packet has a first-in/first-out (FIFO) buffer to which an input clock associated with the data packet and data from the data packet are input. A sample clock derived from a regenerated data clock is used to clock the data out of the FIFO buffer, the regenerated data clock being a function of a reference frequency signal and a period control parameter. The regenerated data clock and input clock are compared to determine a buffer occupancy for the FIFO buffer, from which the period control parameter is derived. From the period control parameter and the buffer occupancy delay variation of the regenerated data clock and of the associated data packet is calculated.

2 Claims, 2 Drawing Sheets

MEASURING DELAY VARIATION OF REGENERATED DATA CLOCK AND OF ASSOCIATED DATA PACKETS

BACKGROUND OF THE INVENTION

The present invention relates to the measurement of time delays, and more particularly to measuring delay variation of regenerated data clocks and of associated data packets.

Knowledge of the variations in the time required to transport packets having data generated at a nominally constant clock frequency allows a user to determine certain Quality of Service (QOS) parameters, and allows a service provider to manage the network so as to provide the required QOS by allocating resources more efficiently. Measurement of the transport delay of data packets and the variation of such delay is normally done either on a round-robin out-of-service basis, or is done using embedded time stamps and some sort of common clock that is available to both the source and destination. Both methods have drawbacks.

The first method cannot accomplish a unidirectional measurement and cannot exclude the possibility that compensatory delay variations may occur on the return path. The second method requires addition and subsequent deletion of the time stamps in a manner that does not compromise the payload integrity, as well as the problem in making the clock available at both the source and destination.

What is desired is a method for measuring delay variations of a regenerated data clock and of the associated data packets that is unidirectional and does not require a clock available at both the source and destination.

BRIEF SUMMARY OF THE INVENTION

Accordingly the present invention provides a method of measuring delay variation of a regenerated data clock and of the associated data packets by regenerating the data clock from a reference clock at a receiver, comparing an input clock associated with the data packets with a clock derived from the regenerated clock to obtain a buffer occupancy for the data from the data packets, and obtaining a period control parameter, knob, that is representative of the delay variation in the regenerated data clock. Using the buffer occupancy and the regenerated data clock, cell arrival variations are determined from which the delay variations are inferred.

The objects, advantages and other novel features of the present invention are apparent from the following detailed description when read in conjunction with the appended claims and attached drawing.

DETAILED DESCRIPTION OF THE INVENTION

The present invention operates on the basis that the data sampling frequency is known approximately at the receiver, and is nominally constant at the source; that the data is packetized according to a known format; that a FIFO buffer is used at the receiver for temporary storage of a packet cell payload together with a means for determining buffer occupancy; that a clock regeneration circuit responsive to the FIFO occupancy is used, such as that described in co-pending U.S. patent application Ser. No. 08/822,964 filed Mar. 21, 1997 by Philip S. Crosby entitled "Digital Clock Synthesizer now abandoned"; and that a means is provided for performing relatively simple mathematical calculations based on the occupancy and clock regeneration parameters.

A digital video signal, such as a SMPTE 292M video signal, is applied to a transmitter input from a source that generates a constant clock frequency. That video clock together with the clock regeneration circuit in the receiver may be used to measure the variations in path delay from the input of the transmitter to the receiver over time.

Figure 1:
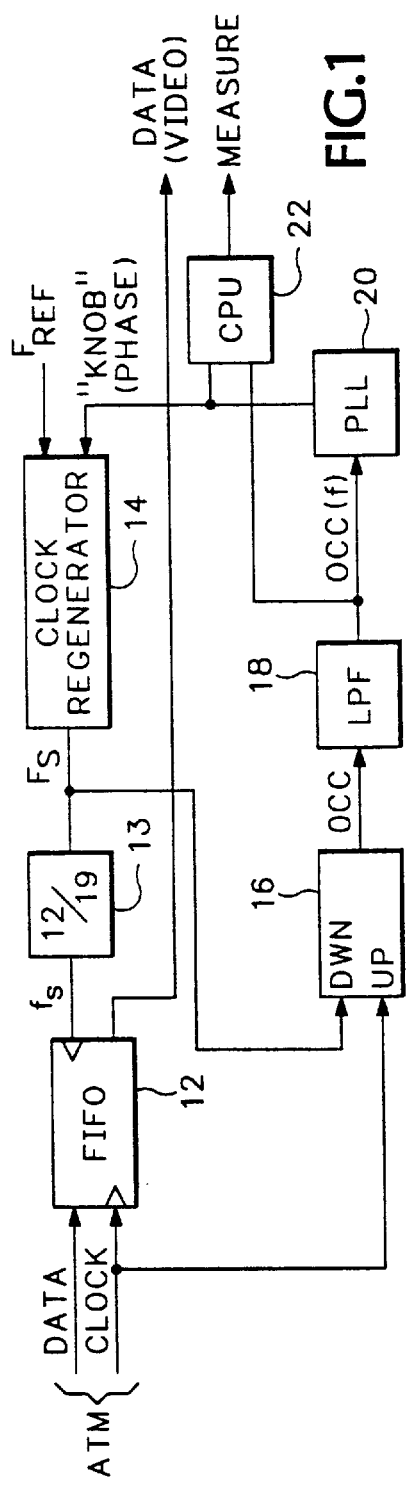
FIG. 1 is a block diagram view of a system for measuring delay variation of a regenerated data clock and of the associated data packets according to the present invention.

Referring now to FIG. 1 an ATM stream with separated data and associated clock is input to a first-in/first-out (FIFO) buffer 12, with the clock being used to load the data into the buffer. A sample clock fs, derived via an appropriate converter circuit 13 from a regenerated clock Fs corresponding to the nominal constant frequency clock at the transmitter source, is applied to the clock output of the buffer 12 to extract the data from the buffer. The sample clock may equal the regenerated data clock where the FIFO buffer word size equals the payload data word size. A clock regenerator 14, as disclosed in the above-mentioned U.S. Patent Application, that is phase controlled provides the regenerated clock Fs in response to a constant frequency reference frequency Fref and a period control signal, herein called knob.

Nominally the occupancy of the FIFO buffer 12 is maintained at approximately fifty percent (50%). An up/down counter circuit 16 has as inputs the regenerated clock Fs and the input clock associated with the data packet. When there is no variation in the path delay, or variation in the time of arrival, the count ratio between the regenerated clock and the input clock maintains the occupancy (OCC) at the nominal 50% indicator. When there is a variation in the delay in the transmission path, which may be caused by added traffic, for example, then the occupancy OCC varies. The variation in the OCC is lowpass filtered by a filter 18, and the filtered occupancy OCC(f) is input to the first stages of a phase-locked loop (PLL) 20. The output from the loop filter of the PLL 20 is the knob period control signal that is applied to the clock regeneration circuit 14. The knob signal is updated at a specified periodic interval, such as every 100 mSec. The knob signal serves to change the period of the regenerated clock Fs so that the regenerated clock maintains the same relative relationship to the video data as the nominally constant frequency clock at the transmitter source.

The granularity of the direct digital synthesizer (DDS) clock regenerator 14 is on the order of twenty (20) ppB/lsb. The DDS period is finely adjusted by the parameter knob. The oscillator in the DDS may more properly be called a Digital Controlled Variable Period Oscillator (DCVPO). The FIFO occupancy is measured at the start of every other packet cell. Those occupancy values (32 bit payload words) are applied to an infinite impulse response (IIR) lowpass filter 18 with a "time constant" of $2^{18}$ samples, equivalent to about 100 mS. This filtered occupancy value is read at 100 mS. Intervals and forms the input to a second-order phase locked loop including the PLL 20 and clock regenerator 14 that uses the DCVPO. The knob parameter and occupancy value OCC(f) are input also to a processor 22 for producing a measurement of the delay variation of the regenerated data clock and of the associated data packet. The actual measurement is of the arrival time variation, from which the delay variation is inferred as indicated below by the processor 22.

Inferring the video delay variation by the processor 22, as an example, occurs as follows:

1. Calculate the average knob parameter over a period T of observation, Ka;
2. S=ΔT/T (approximately −20 nS/(lsb-Sec)) where ΔT=0.1 Sec;
3. Initialize: Acc<−0, n<−0;
4. At each time: Acc+=S*ΔT*(Kn−Ka), VidDelay[n]= Acc.

Working backward calculate the cell arrival variations from the occupancy:

1. R=Fs*12/19 (approximately 46.89 MHz), Occ_Tar= 32768;
2. CellDelay[n]=VidDelay[n]*(Occ_Tar−Occ[n])/R Nineteen (19) video samples (chrominance C and luminance Y) are packed into each payload cell (12 32-bit words), resulting in a buffer output clock s that is 12/19 of the regenerated data clock Fs.

Figure 2:
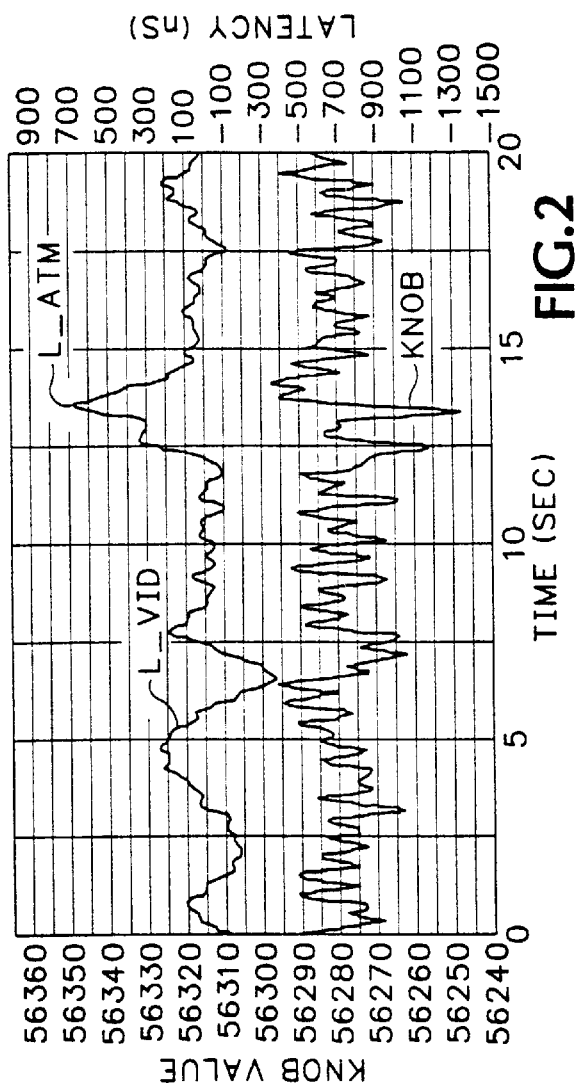
FIGS. 2–4 are graphic views showing delay variation measurement results according to the present invention, FIG. 2 showing delay variation in a steady traffic system, FIG. 3 showing delay variation when additional traffic is added, and FIG. 4 showing delay variation when the additional traffic is stopped.

Since the data stream is perturbed by variations in network overhead, latency is not constant, even if there is no competing traffic. However this provides a realistic baseline for measurement of cell and video delay variations. The measurements shown in FIG. 2 involve the calculation of the average knob value from the data captured on record. The average may be established over a longer interval by low-pass filtering the knob samples with the IIR filter 18. The peak-to-peak video clock latency variation L_VID is a bit more than 1 $\mu$S and the cell latency L_ATM is about 1/3 greater.

Figure 3:
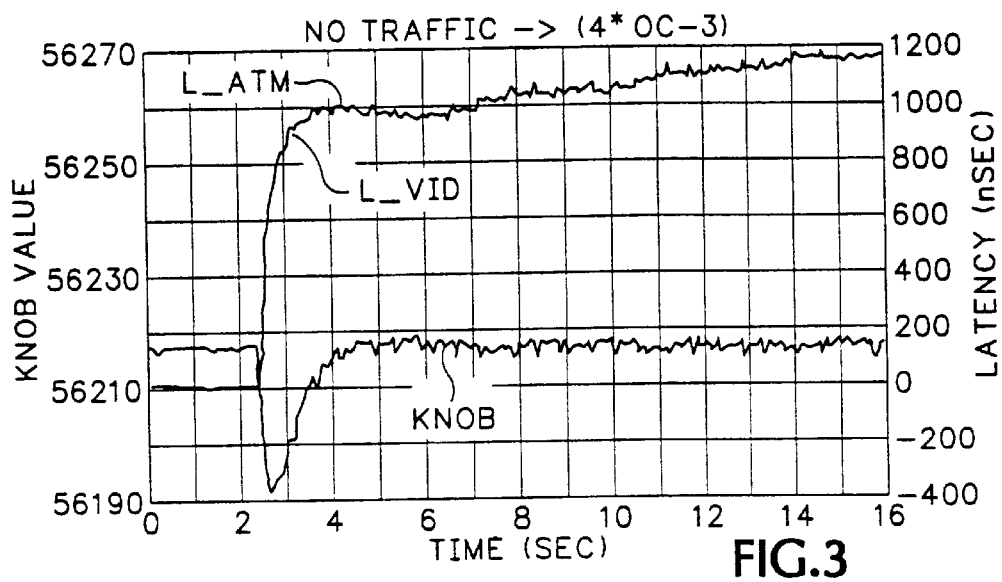
Figure 4:
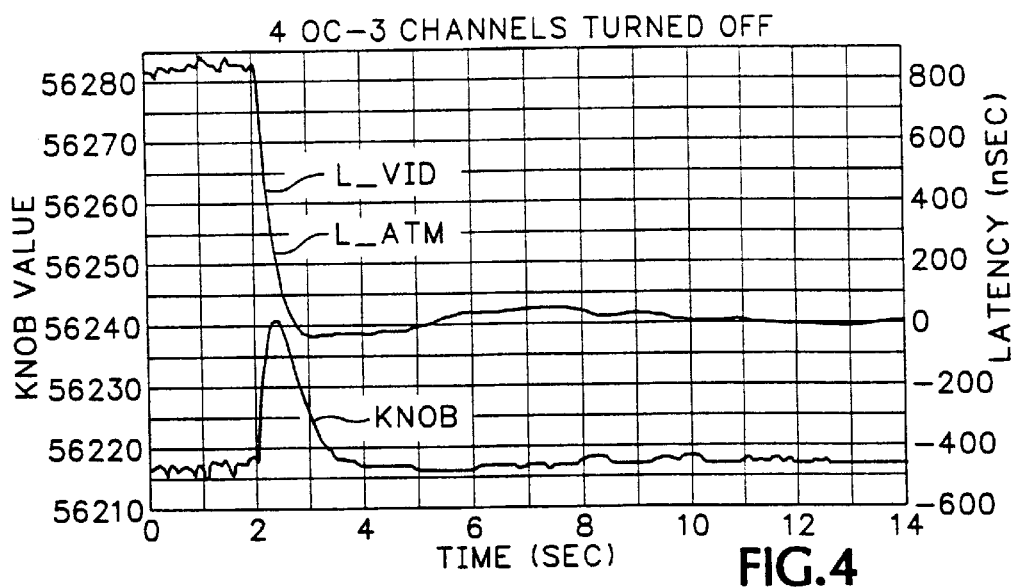

FIGS. 3 and 4 show the effect on the knob value when traffic, such as an additional 4 channels of OC-3 data, are added to an OC-48 channel in the ATM stream, and then turned off. When the system latency changes by about 1 $\mu$Sec due to the added traffic, there is a corresponding change in the knob value, the direction of the change indicating the direction of the change in latency—greater or less.

Thus the present invention measures delay variation of a regenerated data clock and associated data packets by deducing a period control parameter knob from the packet clock and the regenerated clock, and using the knob parameter together with a buffer occupancy parameter to compute variations in latency for the data extracted from the packets as well as for the packet cells themselves.

What is claimed is:

1. A method of measuring delay variation of a regenerated data clock and of the associated data packets comprising the steps of:

regenerating a data clock from a reference frequency signal and a period control parameter;

comparing an input clock for the associated data packets with a clock derived from the regenerated data clock to determine a buffer occupancy;

generating the period control parameter as a function of the buffer occupancy; and calculating from the period control parameter and the buffer occupancy the delay variation of the regenerated data clock and of the associated data packets.

2. An apparatus for measuring delay variation of a regenerated data clock and of the associated data packets comprising:

a first-in/first-out (FIFO) buffer having inputs for receiving an input clock and data from the data packet;

means for regenerating a data clock from a reference frequency signal and a period control parameter to produce the regenerated data clock;

means for comparing the input clock with the regenerated data clock to produce a buffer occupancy value for the FIFO buffer;

means for generating from the buffer occupancy value the period control parameter; and means for calculating as a function of the period control parameter and the buffer occupancy a measure of delay variation of the regenerated data clock and of the associated data packets.

* * * * *